UNITED STATES PATENT OFFICE.

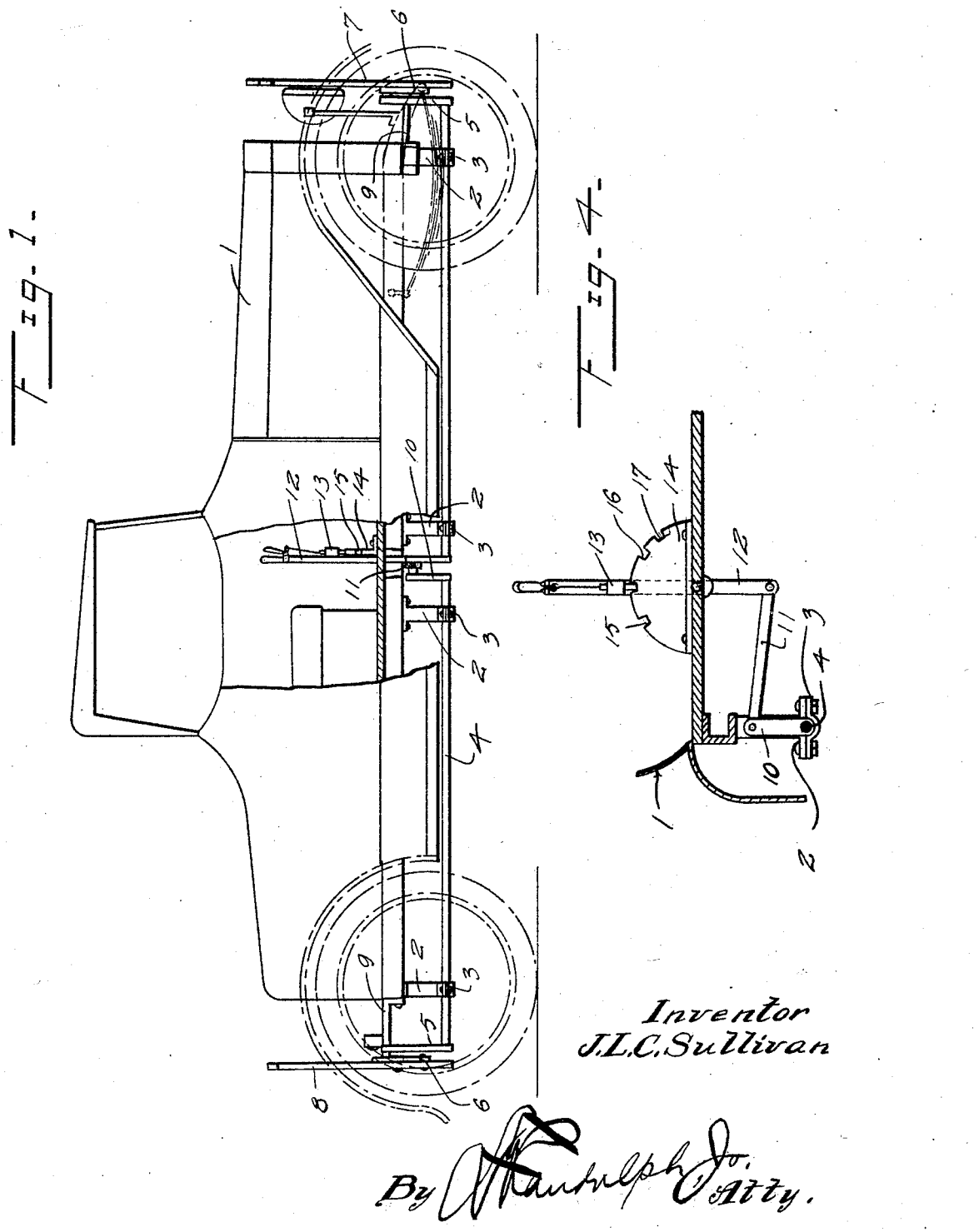

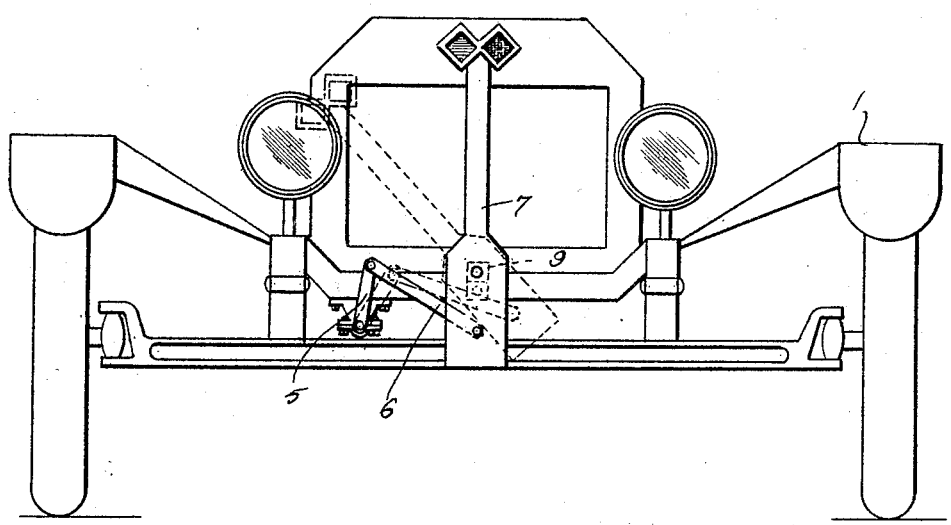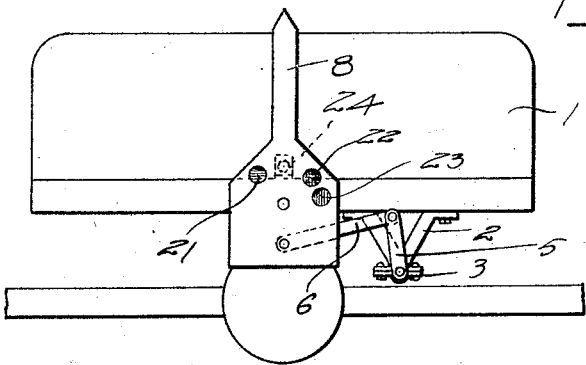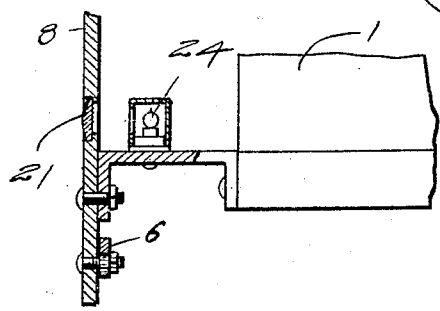

JOHN L. C. SULLIVAN, OF ST. PAUL, MINNESOTA.

DIRECTION INDICATOR FOR AUTOMOBILES.

1,411,756.  Specification of Letters Patent.  Patented Apr. 4, 1922.

Application filed June 20, 1919. Serial No. 305,468.

*To all whom it may concern:*

Be it known that I, JOHN L. C. SULLIVAN, a citizen of the United States, residing at St. Paul, in the county of Ramsey and State of Minnesota, have invented certain new and useful Improvements in Direction Indicators for Automobiles; and I do hereby declare the following to be a full, clear, and exact description of the invention, such as will enable others skilled in the art to which it appertains to make and use the same.

This invention relates to new and useful improvements in direction indicators for automobiles and has for one of its objects the provision of signaling members at the front and rear of an automobile and under the control of the operator, so that on moving said members to various positions the traffic in front and in rear of the respective automobile will be notified in which direction a turn is to be made, or if a stop is contemplated, thus obviating the customary practice of the operator projecting the arm to one side of the automobile when making a turn or stop.

Another object of this invention is the provision of a direction indicator for automobiles of the above stated character, which shall be simple, durable and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawings in which:—

Figure 1 is a side elevation of a direction indicator for automobiles constructed in accordance with my invention, Figure 2 is a front elevation of the same illustrating the front signaling member swung to overlie one of the headlights in dotted lines, Figure 3 is a rear elevation of the device, Figure 4 is a transverse sectional view illustrating the means for operating the signaling members simultaneously, Figure 5 is a detail view illustrating the means of illuminating the rear signal.

Referring in detail to the drawings, the numeral 1 indicates an automobile to which my invention is adapted to be applied. Spaced bearings 2 are preferably secured to the chassis of the automobile and extend downwardly therefrom but may be connected to any other part of the automobile and have formed upon their lower ends removable bearings 3 adapted to rotatably support a longitudinally extending shaft or rod. The rod or shaft 4 extends the entire length of the automobile and projecting a slight distance beyond each end thereof and has adjustably connected thereto arms 5. The ends of the arms 5 have pivoted thereto links 6 which are in turn pivotally connected to front and rear signaling members 7 and 8. The signaling members 7 and 8 are preferably in the form of arrows but may be of any other desired shape and are pivotally mounted on brackets 9, secured to the front and rear of the chassis of the automobile 1. The normal positions of the signaling members are vertical which indicates that the automobile is continuing in a straight course. The rod or shaft 4 is provided with a crank 10 to which is pivoted a rod 11. The rod 11 is in turn pivotally connected to the lower end of a controlling lever 12 that extends upwardly through the floor boards of the automobile 1 in convenient reach of the operator and is provided with a spring catch 13. The controlling lever 12 is adapted to move in relation to an arcuate shaped member or segment 14 secured to the floor boards of the automobile and the lever 12 is pivotally connected or mounted to the automobile in any desired manner. The arcuate shaped member 14 is provided with spaced notches 15, 16, and 17 which are adapted to position the signaling members 7 and 8 to indicate right, left and stop, when the spring catch 13 engages said notches. The notch 18 is provided in the member 14 for receiving the catch to hold the lever 12 in neutral position or in a position retaining the signaling members in non-signaling or vertical position. The front signaling member has secured to its end colored lenses 19 one of which is preferably blue while the other one is yellow. The blue lens is adapted to indicate at night time that a turn is to be made to the right while the yellow lens represents a turn to the left. When the front signaling member 7 is swung to a signaling position to indicate a turn to the right, the blue lens is positioned in front of one of the headlights of the automobile, thus giving a blue light. By moving the indicator to the opposite side to indicate a turn to the left the yellow light will be positioned in front of the other headlight.

The rear signal member 8 is provided with openings 21, 22, and 23 and the rear supporting bracket has positioned thereon an illuminating lamp 24 normally hidden from view when the signaling member 8 is in non-signaling or vertical position. The openings 21 and 22 are closed by blue and yellow lenses while the opening 23 is closed by a red lens. When the signaling member 8 is swung to a signaling position to indicate either a turn to the right or left the lamp will be brought into registration with either of the openings 21 or 22 to give a corresponding light in the rear of the automobile to that given in front by the front signaling member 7. When the controlling lever is moved to a position adjacent the notch 17 with the catch 13 therein, the opening 23 will be in front of the illuminating lamp thus giving a red light indicating to the traffic in rear of the respective automobile that a stop is to be made.

While I have shown and described the preferred embodiment of my invention, it will be understood that minor changes in construction, combination and arrangement of parts may be made without departing from the spirit and scope of the invention as claimed.

Having thus described my invention, what I claim is:—

In combination, an automobile having spaced lamps at its front end, a bracket secured to the front end of the automobile and projecting forwardly beyond and between and in a plane below said lamps, a signaling member pivoted to the bracket and normally arranged vertically and terminating at its upper end in a plane above the lamps, and having its lower end enlarged to normally position said member vertically, an operating means for swinging the signaling member laterally towards either of the lamps into signaling positions, and oppositely extending frames secured to the upper end of said member and carrying different color lenses adapted to project over portions of the fronts of said lamps when said member is in its signalling positions.

In testimony whereof I affix my signature in presence of two witnesses.

JOHN L. C. SULLIVAN.

Witnesses:
H. A. FRANZ.
MALCOLM E. NICHOLS.